US009491475B2

(12) United States Patent
Pearson (10) Patent No.: US 9,491,475 B2
(45) Date of Patent: Nov. 8, 2016

(54) APPARATUSES AND METHODS FOR PROVIDING QUANTIZED COEFFICIENTS FOR VIDEO ENCODING

(75) Inventor: Eric C. Pearson, Conestogo (CA)

(73) Assignee: Magnum Semiconductor, Inc., Milpitas, CA (US)

( * ) Notice: Subject to any disclaimer, the term of this patent is extended or adjusted under 35 U.S.C. 154(b) by 1039 days.

(21) Appl. No.: 13/434,736

(22) Filed: Mar. 29, 2012

(65) Prior Publication Data

US 2013/0259119 A1 Oct. 3, 2013

(51) Int. Cl.
| | |
|---|---|
| *H04N 7/32* | (2006.01) |
| *H04N 19/19* | (2014.01) |
| *H04N 19/147* | (2014.01) |
| *H04N 19/124* | (2014.01) |
| *H04N 19/176* | (2014.01) |
| *H04N 19/91* | (2014.01) |
| *H04N 19/149* | (2014.01) |

(52) U.S. Cl.
CPC ............ *H04N 19/19* (2014.11); *H04N 19/124* (2014.11); *H04N 19/147* (2014.11); *H04N 19/149* (2014.11); *H04N 19/176* (2014.11); *H04N 19/91* (2014.11)

(58) Field of Classification Search
CPC .. H04N 19/147; H04N 19/19; H04N 19/124; H04N 19/176; H04N 19/91; H04N 19/13
USPC ............ 375/240.02, 3, 240, 240.24, E7.211
See application file for complete search history.

(56) References Cited

U.S. PATENT DOCUMENTS

| | | | |
|---|---|---|---|
| 5,844,945 A | 12/1998 | Nam et al. | |
| 6,043,844 A | 3/2000 | Bist et al. | |
| 6,771,831 B2 | 8/2004 | Effros et al. | |
| 7,061,410 B1 | 6/2006 | Pearson et al. | |
| 7,072,387 B1 * | 7/2006 | Betts .................... H04L 1/0041 375/219 |
| 7,593,583 B2 | 9/2009 | Inada | |
| 7,596,179 B2 | 9/2009 | Shen et al. | |
| 7,957,600 B2 | 6/2011 | Yang | |

(Continued)

FOREIGN PATENT DOCUMENTS

| | | |
|---|---|---|
| EP | 1 906 676 A1 | 2/2008 |
| JP | H11275578 A | 10/1999 |

(Continued)

OTHER PUBLICATIONS

Yu, Xiang, Image and Video Coding/Transcoding: A Rate Distortion Approach, A PHD. thesis presented to the University of Waterloo, Ontario, Canada, 2008.*

(Continued)

*Primary Examiner* — William C Vaughn, Jr.
*Assistant Examiner* — Naod Belai
(74) *Attorney, Agent, or Firm* — Dorsey & Whitney LLP (57) ABSTRACT

Apparatuses and methods for optimizing rate-distortion costs in a signal are disclosed. An apparatus may comprise a quantization block that may be configured to generate a plurality of candidates for each of a plurality of coefficients. The quantization block may further generate a respective plurality of arcs based, at least in part, on the plurality of candidates. The quantization block may be configured to determine which of the plurality of arcs has a lowest cost using a trellis optimization technique. Fractional bit estimations may be used to calculate rate, and inverse lambda may be used to calculate candidate coefficients.

21 Claims, 9 Drawing Sheets

(56) References Cited

U.S. PATENT DOCUMENTS

| | | | |
|---|---|---|---|
| 7,995,649 B2 | 8/2011 | Zuo et al. | |
| 8,031,777 B2 | 10/2011 | Haskell et al. | |
| 8,130,828 B2 | 3/2012 | Hsu et al. | |
| 8,175,167 B2 | 5/2012 | Bouton et al. | |
| 8,208,548 B2 | 6/2012 | Nagaraj et al. | |
| 9,185,419 B2 | 11/2015 | Le Leannec et al. | |
| 2006/0013497 A1* | 1/2006 | Yang | H04N 19/147 382/245 |
| 2006/0220927 A1* | 10/2006 | Park | H03M 7/4006 341/50 |
| 2006/0227868 A1 | 10/2006 | Chen et al. | |
| 2006/0245502 A1 | 11/2006 | Cheng et al. | |
| 2007/0189392 A1 | 8/2007 | Tourapis et al. | |
| 2007/0285285 A1* | 12/2007 | Puri | H04N 19/105 341/50 |
| 2008/0130745 A1 | 6/2008 | Pandit et al. | |
| 2008/0247462 A1 | 10/2008 | Demos | |
| 2009/0141814 A1 | 6/2009 | Yin et al. | |
| 2009/0168868 A1* | 7/2009 | Jahanghir | H03M 7/4006 375/240.02 |
| 2009/0196517 A1 | 8/2009 | Divorra Escoda et al. | |
| 2009/0238271 A1 | 9/2009 | Kim et al. | |
| 2009/0257489 A1* | 10/2009 | Karczewicz | H04N 19/126 375/240.03 |
| 2010/0008417 A1 | 1/2010 | Xu et al. | |
| 2010/0046614 A1 | 2/2010 | Choi et al. | |
| 2010/0177819 A1 | 7/2010 | Jeon et al. | |
| 2010/0220937 A1 | 9/2010 | Furbeck | |
| 2010/0238997 A1* | 9/2010 | Yang | H04N 19/105 375/240.03 |
| 2010/0266047 A1* | 10/2010 | Takahashi | H04N 19/176 375/240.22 |
| 2010/0316118 A1 | 12/2010 | Li et al. | |
| 2011/0164677 A1* | 7/2011 | Lu | H04N 19/176 375/240.02 |
| 2012/0014435 A1 | 1/2012 | Yang et al. | |
| 2012/0020549 A1 | 1/2012 | Lee et al. | |
| 2012/0076203 A1 | 3/2012 | Sugimoto et al. | |
| 2012/0140822 A1 | 6/2012 | Wang et al. | |
| 2012/0219057 A1* | 8/2012 | Takahashi | H04N 19/176 375/240.03 |
| 2013/0064290 A1 | 3/2013 | Kung et al. | |
| 2013/0114717 A1 | 5/2013 | Zheng et al. | |
| 2013/0188686 A1 | 7/2013 | Tourapis | |
| 2013/0208901 A1 | 8/2013 | Chen et al. | |
| 2013/0235938 A1 | 9/2013 | Huang et al. | |
| 2013/0279583 A1 | 10/2013 | Gao et al. | |
| 2013/0329784 A1 | 12/2013 | Chuang et al. | |
| 2014/0269902 A1* | 9/2014 | Pearson | H04N 19/124 375/240.03 |
| 2015/0172660 A1 | 6/2015 | Wang et al. | |
| 2015/0172662 A1 | 6/2015 | Pearson | |

FOREIGN PATENT DOCUMENTS

| | | |
|---|---|---|
| JP | 2012104926 A | 5/2012 |
| WO | 2007081908 A1 | 7/2007 |
| WO | 2009049248 A2 | 4/2009 |
| WO | 2009126919 A1 | 10/2009 |
| WO | 2009155398 A1 | 12/2009 |
| WO | 2012142731 A1 | 10/2012 |
| WO | 2014149818 A1 | 9/2014 |
| WO | 2015094557 A1 | 6/2015 |
| WO | 2015094560 A1 | 6/2015 |

OTHER PUBLICATIONS

"Text of ISO/IEC 14496-10:200X / FDIS Advanced Video Coding (4th Edition)", 81. MPEG Meeting; Feb. 6, 2007-Jun. 6, 2007; Lausanne, (Motion Picture Expert Group or ISO/IEC JTC1/SC29/WG11); No. N9198, Oct. 28, 2007; EP030015692, ISSN: 0000-0130.

Tourapis, Alexis M. et al., "Reduced Resolution UPDTE Mode for Enhanced Compression", Joint Collaborative Team on Video Coding (JCT-VC) of ITU-T SG16 WP3 and ISO/IEC JTC1/SC29/WG11; 8th Meeting: San Jose, CA, USA, Feb. 1-10, 2012.

Wedi, Thomas et al., "Intra only 4:4:4 coding for H.264/AVC FRExt", Joint Video Team (JVT) of ISO/IEC MPEG & ITU-T VCEG, 16th Meeting: Poznan, PLC, Jul. 24-29, 2005.

Extended European Search Report received for PCT/US2013034622 dated Oct. 12, 2015.

Luttrell, et al., "Trellis-based R-D optimal quantization in H.263+", 2000 International Conference on Sep. 10-13, 2000, IEEE, Piscataway, NJ, USA, Sep. 10, 2000 pp. 852-854, vol. 2, XP031534587, ISBN: 978-0-7803-6297-0, Sep. 10, 2000, 852-854.

Reisman, et al., "Multiple description video using ratedistortion splittin", Proceedings 2001 International Conference on Image Processing. ICIP 2001 Thessaloniki, Greece, Oct. 7-10, 2001; [International Conference on Image Processing], Institute of Electrical and Electronics Engineers, New York, NY, vol. 1, Oct. 7, 2001 {200, 978-981.

Wanga, et al., "Rate distortion optimized quantization for H.264/AVC based on dynamic programming", Visual Communications and Image Processing; Dec. 7, 2005-Jul. 15, 2005; Beijing, Jul. 12, 2005, XP030081056, pp. 2102-2103., Jul. 12, 2005, 2100-2111.

Zhang, et al., "Variable-Bin-Rate CABAC Engine for H.264/AVC High Definition Real-Time Decoding", IEEE Transactions on very Large Scale Integration (VLSI)Systems, IEEE Service Center, Piscataway, NJ, USA, vol. 17, No. 3, Mar. 1, 2009, pp. 417-426, XP011249867, ISSN: 1063-8210, DOI: 10.1109/TVLSI.2008.2005286 figure 8, Mar. 1, 2009, 417-426.

First Office Action received for JP appl. No. 2015-503642 dated Dec. 15, 2015.

Second Office Action received for CA Appl. No. 2,868,487 dated Dec. 29, 2015.

Chen, Bo-Yuan et al., ""Using H.264 Coded Block Patterns for Fast Inter-mode Selection"", Proc. of the IEEE Int. Conf. on Multimedia and Expo 2008, Jun. 2008, pp. 721-724. ISBN: 978-1-4244-2570-9.

Zhang, Peng et al., ""Variable-Bin-Rate CABAC Engine for H.264/AVC High Definition Real-Time Decoding"", IEEE Transactions on Very Large Scale Integration (VLSI) Systems, vol. 17,No. 3, Mar. 2009, pp. 417-426, ISSN: 1063-8210.

Merritt, Loren , *"Notes on the Implementation of Trellis Quantization in H.264"*, http://akuvian.org/src/x264/trellis.txt, Nov. 3, 2011.

Yang, En-Hui et al., *"Rate Distortion Optimization in H.264"*, Department of Electrical and Computer Engineering, University of Waterloo, Waterloo, Ontario N2L 6E3, Canada (no publication date provided).

International Search Report and Written Opinion mailed Jul. 29, 2013 for Appl No. PCT/US2013/034622.

"H.263: Video coding for low bit rate communication", www.itu.int.rec/T-REC-H.263/e, updated Mar. 6, 2007 (printed Jan. 8, 2013).

"H.264: Advanced video coding for generic audiovisual services", www.itu.int/rec/T-REC-H.264/e, updated Aug. 9, 2012 (printed Jan. 8, 2013).

International Telecommunication, "Video coding for low bit rate communication", www.itu.int, Jan. 2005, 1-226.

Karczewicz "A Hybrid Video Codec Based on Extended Block Sizes, Recursive Integer Transforms, Improved Interpolation, and Flexible Motion Representation", Proc. SPIE 7882, Visual Information Processing and Communication II, 788203; Jan. 31, 2011.

Karczewicz et al., "Rate Distortion Optimized Quantization", Doc VCEGAH21, ITU-T SG16/Q6 VCEG, Antalya, TR (2008) Joint Video Team (JVT) of ISO/IEC MPEG & ITU-T VCEG (ISO/IEC JTC1/SC29/WG11, and ITU-T SG16 Q.6) 27th Meeting: Geneva, CH, Apr. 24-29, 2008.

Li, et al., "Rate-Distortion Optimized Frame Level Rate Control for H.264/AVC", 16th European Signal Processing Conference (EUSIPCO 2008), Lausanne, Switzerland, Aug. 25-29, 2008, copyright by EURASIP.

* cited by examiner

APPARATUSES AND METHODS FOR PROVIDING QUANTIZED COEFFICIENTS FOR VIDEO ENCODING

TECHNICAL FIELD

Embodiments of this invention relate generally to video encoding, and more specifically, to the quantization of transform coefficients.

BACKGROUND

Video or other media signals, may be used by a variety of devices, including televisions, broadcast systems, mobile devices, and both laptop and desktop computers. Typically, devices may display video in response to receipt of video or other media signals, often after decoding the signal from an encoded form. Video signals provided between devices are often encoded using one or more of a variety of encoding and/or compression techniques, and video signals are typically encoded in a manner to be decoded in accordance with a particular standard, such as MPEG-2, MPEG-4, and H.264/MPEG-4 Part 10. By encoding video or other media signals, then decoding the received signals, the amount of data needed to transmit video between devices may be significantly reduced.

Video encoding typically proceeds by encoding macroblocks, or other units, of video data. Prediction coding may be used to generate predictive blocks and residual blocks, where the residual blocks represent a difference between a predictive block and the block being coded. Prediction coding may include spatial and/or temporal predictions to remove redundant data in video signals, thereby further increasing the reduction of data. Intracoding for example, is directed to spatial prediction and reducing the amount of spatial redundancy between blocks in a frame or slice. Intercoding, on the other hand, is directed toward temporal prediction and reducing the amount of temporal redundancy between blocks in successive frames or slices. Intercoding may make use of motion prediction to track movement between corresponding blocks of successive frames or slices.

Typically, in encoder implementations, including intracoding and intercoding based implementations, residual blocks (e.g., difference between actual and predicted blocks) may be transformed, quantized, and encoded using one of a variety of encoding techniques (e.g., entropy encoding) to generate a set of coefficients. It is these coefficients that may be transmitted between the encoding device and the decoding device. Quantization may be determinative of the amount of loss that may occur during the encoding of a video stream. That is, the amount of data that is removed from a bitstream may be dependent on a quantization parameter generated by and/or provided to an encoder.

Video encoding techniques typically perform some amount of rate-distortion optimization. That is, there is generally a trade-off between an achievable data rate and the amount of distortion present in a decoded signal. Many encoders utilize quantization for rate-distortion optimization of a video signal in accordance with one or more coding standards. In doing so, however, costs, including rate costs and distortion costs, must be calculated so that coefficients of each residual block may be optimized for the selected coding standard. This cost measurement requires not only transformation and quantization of coefficients, but encoding of the coefficients as well. As a result, and in particular for more complex encoding algorithms, optimizing coefficients in real-time has presented challenges. Because many coding standards require highly complex and demanding computations for encoding, rate calculation, and therefore, rate-distortion optimization, for many current coding standards, is simply too demanding for completion in real-time.

DETAILED DESCRIPTION

Examples of methods and apparatuses for optimizing rate-distortion costs in a signal are described herein. Certain details are set forth below to provide a sufficient understanding of embodiments of the invention. However, it will be clear to one having skill in the art that embodiments of the invention may be practiced without these particular details, or with additional or different details. Moreover, the particular embodiments of the present invention described herein are provided by way of example and should not be used to limit the scope of the invention to these particular embodiments. In other instances, well-known video components, encoder or decoder components, circuits, control signals, timing protocols, and software operations have not been shown in detail in order to avoid unnecessarily obscuring the invention.

Figure 1:
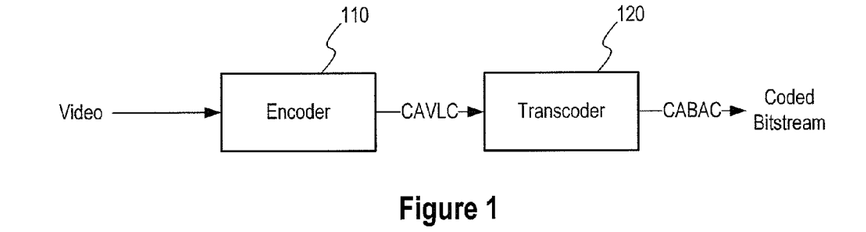
FIG. 1 is a block diagram of an apparatus according to an embodiment of the invention.

FIG. 1 is a block diagram of an apparatus 100 according to an embodiment of the invention. The apparatus 100 may include an encoder 110 and a transcoder 120. The encoder 110 may be coupled to the transcoder 120 and may be configured to receive a signal, such as a video signal that, in one embodiment, may comprise video data (e.g., frames). The apparatus 100 may be implemented in any of a variety of devices employing video encoding, including but not limited to, televisions, broadcast systems, mobile devices, and both laptop and desktop computers. Generally, the encoder 110 may operate at a fixed rate to output a bitstream that may be generated in a rate-independent manner (e.g. CAVLC). The transcoder 120 may then convert the bitstream into an arithmetically coded stream format (e.g. CABAC) in realtime, in this manner operating at a constant time per bit.

The encoder 110 may include one or more logic circuits, control logic, logic gates, processors, memory, and/or any combination or sub-combination of the same, and may be configured to encode and/or compress a video signal using one or more encoding techniques, examples of which will be described further below. The encoder 110 may be configured, for example, to encode a variable bit rate signal and/or a constant bit rate signal. In at least one embodiment, the encoder 110 may include an entropy encoder, such as a context-adaptive variable-length coding (CAVLC) encoder, and/or may be configured to encode data, for instance, at a macroblock level. Each macroblock may be encoded in intra-coded mode, inter-coded mode, bidirectionally, or in any combination or subcombination of the same. Accordingly, the encoder 110 may operate at a fixed rate and may provide CAVLC data to the transcoder 120.

The transcoder 120 may comprise any transcoder in the art, known now or the future, and may, for example, be configured to transcode a bitstream encoded with a first encoding technique to a bitstream encoded with a second encoding technique. The transcoder 120 may be configured, for instance, to convert a CAVLC encoded bitstream received from the encoder 110 to a context-adaptive binary arithmetic coding (CABAC) encoded bitstream. Moreover, the transcoder 120 may further be configured to receive a bitstream having a constant bit rate, and/or may be configured to transcode in real-time, operating at a constant time per bit.

In an example operation of the apparatus 100, the encoder 110 may receive and encode a video signal in accordance with one or more encoding techniques to provide an encoded bitstream. The encoded bitstream may be provided to the transcoder 120, which may subsequently provide (e.g., generate) a transcoded bitstream based, at least in part, on the encoded bitstream. The transcoded bitstream may be provided, for example, to a data bus and/or to a device, such as a decoder (not shown). As will be explained in more detail below, a video signal may be encoded by the encoder 110 such that the rate-distortion of the video signal may be optimized. In one embodiment, for example, rate and/or distortion of a video signal may be optimized by optimizing quantized coefficients during an encoding process. Rate-distortion optimization refers to a process designed to select a particular rate-distortion trade-off where a sufficient rate is maintained with an allowable amount of distortion. Rate-distortion may typically be represented by a lambda factor $\lambda$, or lambda, multiplied by the rate and the product added to the distortion. This equation may be referred to as the "RD score." Generally, encoding methods may aim to minimize the RD score.

Figure 2:
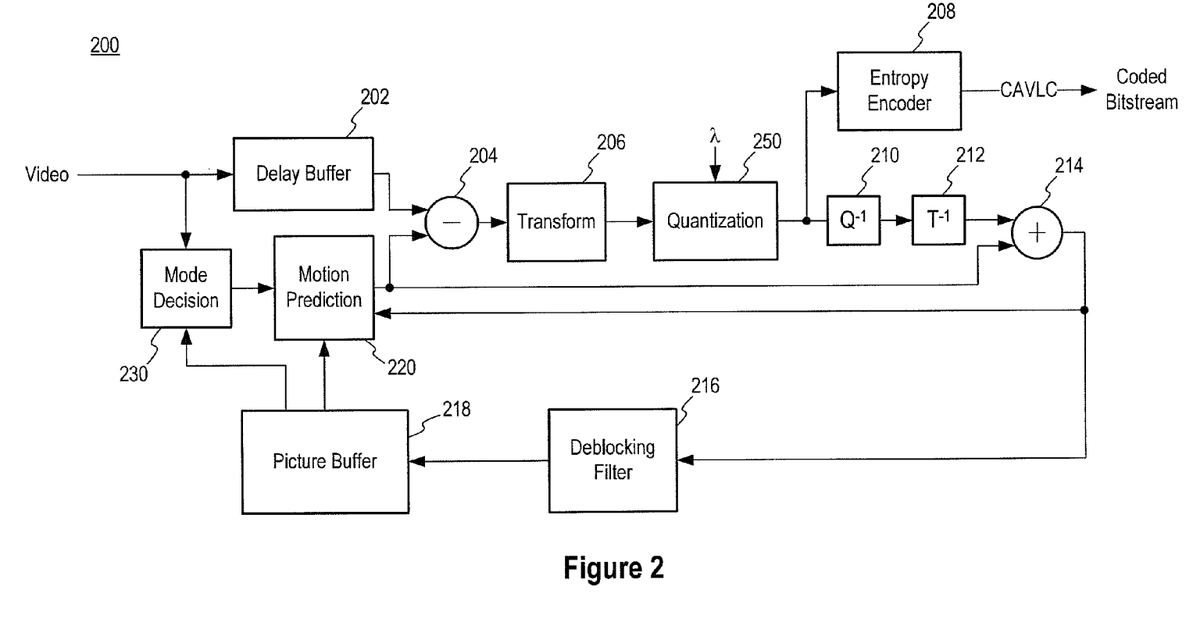
FIG. 2 is a schematic block diagram of an encoder that may be used in the apparatus of FIG. 1 according to an embodiment of the invention.

FIG. 2 is a schematic block diagram of an encoder 200 according to an embodiment of the invention. The encoder 200 may be in part used to implement the encoder 110 of FIG. 1, and may further be compliant with the H.264 standard. In some embodiments, the encoder 200 may be compliant with one or more other compression standards in the art, known now or in the future.

The encoder 200 may include a mode decision block 230, a prediction block 220, a delay buffer 202, a transform 206, a quantization block 250, an entropy encoder 208, an inverse quantization block 210, a deblocking filter 216, and a decoded picture buffer 218. The mode decision block 230 may be configured to determine an appropriate coding mode based, at least in part, on the incoming base band video signal and decoded picture buffer signal, described further below, and/or may determine an appropriate coding mode on a per frame and/or macroblock basis. The mode decision may include macroblock type, intra modes, inter modes, motion vectors, and quantization parameters. In some examples of the present invention, the mode decision block 230 may provide lambda that may be used by the optimized quantization block 250, described further below. The mode decision block 230 may also utilize lambda in making mode decisions in accordance with examples of the present invention.

The output of the mode decision block 230 may be utilized by the prediction block 220 to generate the predictor in accordance with H.264 normative methods, or other prediction techniques. The predictor may be subtracted by a delayed version of the video signal at the subtractor 204. Using the delayed version of the video signal may provide time for the mode decision block 230 to act. The output of the subtractor 204 may then be the residual, e.g. the difference between a block and a predicted block.

The transform 206 may be configured to perform a transform, such as a discrete cosine transform (DCT), on the signal to produce a block of coefficients that may, for instance, correspond to spectral components of data in the video signal. Generally, the transform 206 may transform the residual to the frequency domain. The frequency domain representation of the residual may be referred to as the coefficient block. The quantization block 250 may be configured to receive the coefficient block and quantize the coefficients of the coefficient block to produce a quantized coefficient block. The quantization provided by the quantization block 250 may be lossy, but may utilize lambda to optimize or adjust rate-distortion. Lambda may be received from the mode decision block 230, or may be specified by the user. The lambda factor may change, e.g. per macroblock or other unit, and may be based on information encoded by the video signal (e.g. video signals encoding advertising may utilize a generally smaller lambda than video signals encoding detailed scenes).

In turn, the entropy encoder 208 may encode the quantized coefficient block to provide an encoded bitstream. The entropy encoder 208 may be any entropy encoder known by those having ordinary skill in the art, such as a CAVLC encoder. The optimized quantized coefficients may also be inverse scaled and quantized by the inverse quantization block 210. The inverse scaled and quantized coefficients may be inverse transformed by the inverse transform block 212 to produce a reconstructed residual. The reconstructed residual may be added to the predictor at the adder 214 to produce reconstructed video, which may be deblocked by the deblocking filter 216, written to the decoded picture buffer 218 for use in future frames, and fed back to the mode decision block 230 for further in-macroblock intra prediction or other mode decision methods.

The quantization block 250 may be configured to provide a quantized coefficient block having optimized coefficients such that a cost associated with each coefficient is optimized. In one embodiment, for example, this optimization may be based, at least in part, on a Lagrangian cost function, such as lambda, that may be provided by the mode decision block 230. In another embodiment, the optimization may be based, at least in part, on the inverse of the signal lambda, or inverse lambda. Lambda may, for instance, be a rate scaling factor for determining a cost (e.g., rate-distortion cost) for a signal. Moreover, lambda may be generated by the mode decision block 230 based, at least in part, on the signal, and may be fixed or adjusted in real-time.

As discussed, the encoder 200 may operate in accordance with the H.264 video coding standard. Thus, because the H.264 video coding standard employs motion prediction and/or compensation, the encoder 200 may further include a feedback loop that includes an inverse quantization block 210, an inverse transform 212, a reconstruction adder 214, and a deblocking filter 216. These elements may mirror elements included in a decoder (not shown) that is configured to reverse, at least in part, the encoding process performed by the encoder 200. Additionally, the feedback loop of the encoder may include a prediction block 220 and a decoded picture buffer 218.

In an example operation of the encoder 200, a video signal (e.g. a base band video signal) may be provided to the encoder 200. The video signal may be provided to the delay buffer 202 and the mode decision block 230. The subtractor 204 may receive the video signal from the delay buffer 202 and may subtract a motion prediction signal from the video signal to generate a residual signal. The residual signal may be provided to the transform 206 and processed using a forward transform, such as a DCT. As described, the transform 206 may generate a coefficient block that may be provided to the quantization block 250, and the quantization block 250 may quantize and/or optimize the coefficient block such that the cost of coefficients in the coefficient block are optimized. In one embodiment, quantization of the coefficient block may be based, at least in part, on lambda or inverse lambda. Quantized coefficients may be provided to the entropy encoder 208 and encoded into an encoded bitstream.

The quantized coefficient block may further be provided to the feedback loop of the encoder 200. That is, the quantized coefficient block may be inverse quantized, inverse transformed, and added to the motion prediction signal by the inverse quantization block 210, the inverse transform 212, and the reconstruction adder 214, respectively, to produce a reconstructed video signal. Both the prediction block 220 and the deblocking filter 216 may receive the reconstructed video signal, and the decoded picture buffer 218 may receive a filtered video signal from the deblocking filter 216. Based, at least in part, on the reconstructed and filtered video signals, the prediction block 220 may provide a motion prediction signal to the adder 204.

Accordingly, the encoder of FIG. 2 may provide a coded bitstream based on a video signal, where the coded bitstream is generated using coefficients optimized in accordance with embodiments of the present invention. The coded bitstream may be a CAVLC bitstream that may operate at a fixed rate. The encoder may be operated in semiconductor technology, and may be implemented in hardware, software, or combinations thereof. In some examples, the encoder may be implemented in hardware with the exception of the mode decision block that may be implemented in software. In other examples, other blocks may also be implemented in software, however software implementations may not achieve real-time operation.

Figure 3:
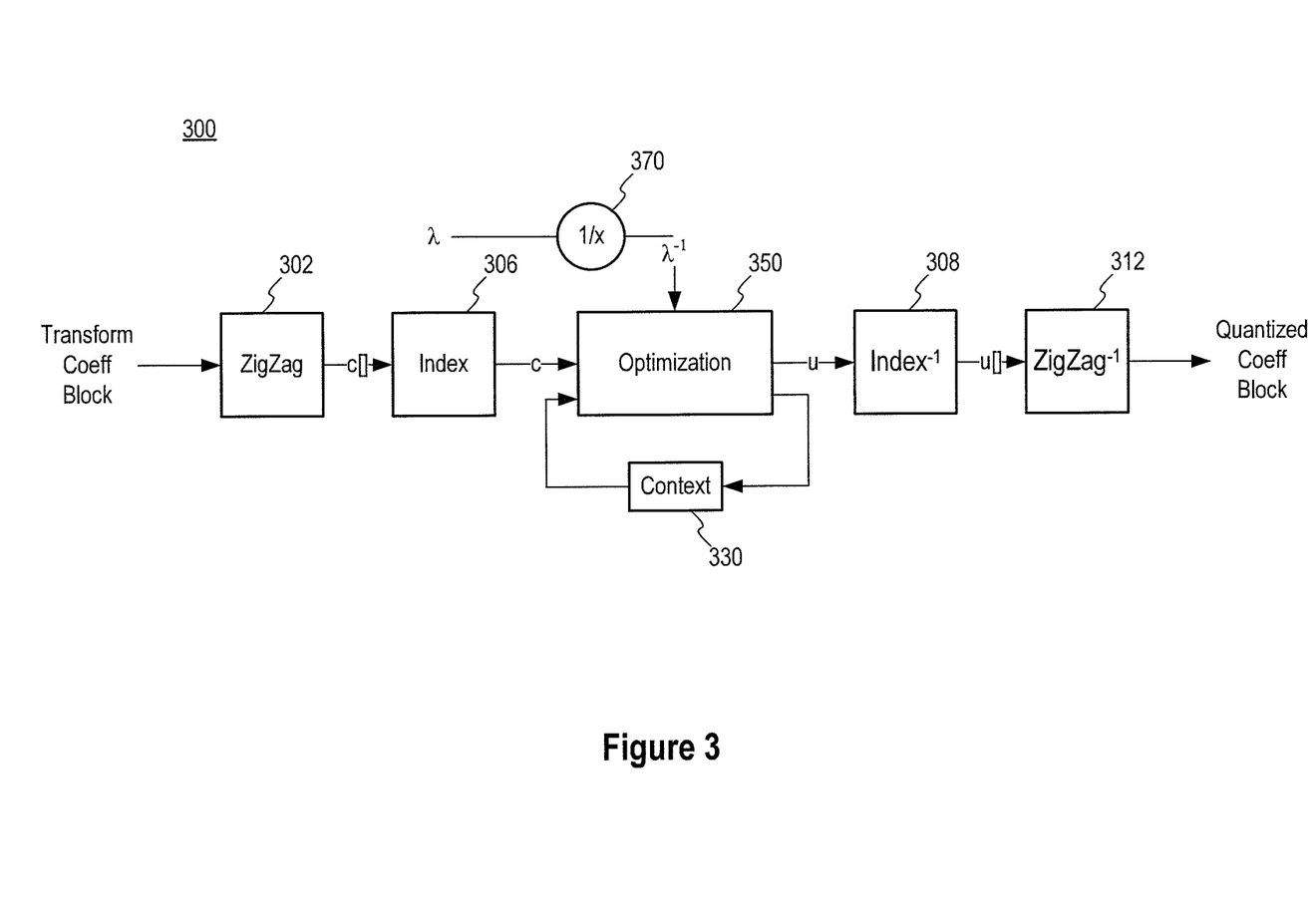
FIG. 3 is a schematic block diagram of a quantization block that may be used in the encoder of FIG. 2 according to an embodiment of the invention.

FIG. 3 is a schematic block diagram of a quantization block 300 according to an embodiment of the invention. The quantization block 300 may be used to implement the quantization block 250 of FIG. 2. The quantization block 300 may be configured to receive a block of coefficients (e.g. coefficient block) and quantize the coefficient block to generate a quantized coefficient block that may include optimized quantized coefficients. For example, the coefficient block received by the quantization block 250 may be provided by the transform 206, which may be a standard transform used in H.264 encoders. The coefficients may be quantized and optimized to generate a quantized coefficient block.

In an example operation of the quantization block 300, a coefficient block may be provided to a forward ordering block 302 from, for example, a transform such as the transform 206 of FIG. 2. The forward ordering block 302 may convert the coefficients of the coefficient block to a coefficient vector using, for example, one or more zigzag operations to place the coefficients in bitstream coefficient order (e.g. for CABAC encoding). The coefficients may then be provided one at a time to a remainder of the quantization block performing a block optimization process that may utilize a starting CABAC context, and on processing a last coefficient, the optimization process may provide a set of optimized, quantized coefficients (output as u[ ] in FIG. 3), and a new CABAC context. The optimized, quantized coefficients may optionally be inverse zig-zagged and output as a quantized coefficient block.

Accordingly, the coefficient vector c[ ] may be indexed by the forward index block 306, for instance, to reduce the number of possible coefficient values and/or the amount of data required to represent each coefficient value. The indexed coefficient vector may then be provided to the block optimization circuit 350, such that coefficients may be received one at a time.

The inverter 370 may receive lambda, and may provide inverse lambda to the optimization block 350. Using inverse lambda and a context (e.g., CABAC context) received from the context register 330, the optimization block 350 may receive the coefficient vector and provide an optimized quantized coefficient vector. In some embodiments, the optimization block 350 may be configured to receive lambda directly from a mode decision block and may optimize the coefficients based, at least in part, on lambda or inverse lambda. Moreover, the context received by the optimization block 350 from the context register 330 may be an initial context, and in optimizing the coefficients, the block optimization circuit 350 may iteratively provide the context register 330 with an updated context as each coefficient is quantized and/or optimized. The updated context provided to the context register 330 may be used in quantizing and/or optimizing the next coefficient of the coefficient vector, and/or may be used as an initial context for other coefficient vectors, as will be described further below.

The reverse index block 308 may subsequently rescale the optimized quantized coefficient vector, and the inverse ordering block 304 may convert the vector to a quantized coefficient block, for example, by performing an inverse zigzag operation. The quantized coefficient block may be provided to an entropy encoder, such as the entropy encoder 208 of FIG. 2, and encoded in accordance with one or more encoding methods.

In this manner, examples of optimized quantization blocks described herein may process coefficients using one cycle per coefficient, resulting in a bounded time optimization. Any number of coefficients may be processed per block, however generally a fixed number of coefficients are provided per block, such as, but not limited to, 64, 16, 15, 8, or 4 coefficients per block.

Figure 4:
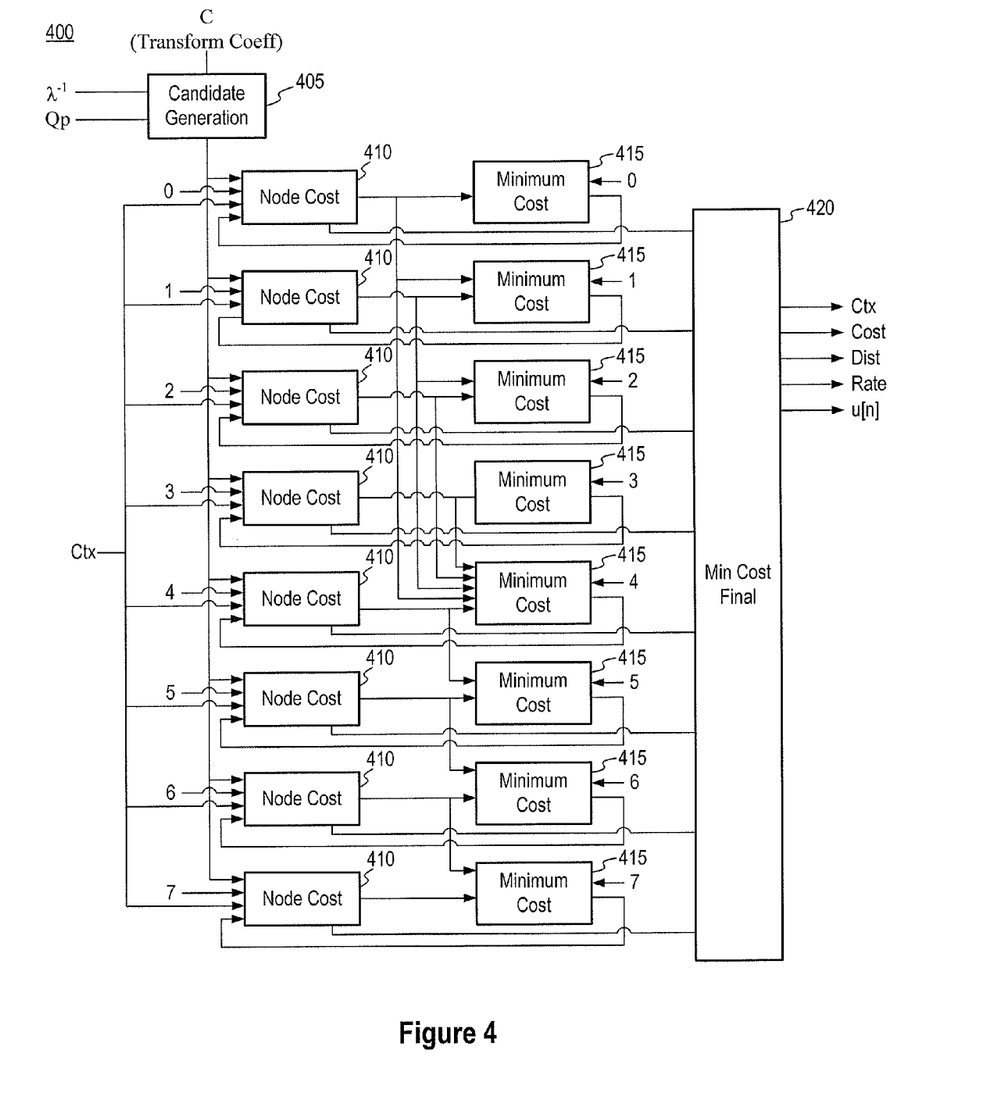
FIG. 4 is a schematic block diagram of an optimization block that may be used in the quantization block of FIG. 3 according to an embodiment of the invention.

FIG. 4 is a schematic block diagram of an optimization block 400 according to an embodiment of the invention. The optimization block 400 may be used to implement the optimization block 350 of FIG. 3 and further may be used in the quantization block 250 of FIG. 2. The optimization block 400 may include a candidate generation block 405, a plurality of node cost blocks 410, a plurality of minimum cost blocks 415, and a final minimum cost block 420. As shown, elements of the optimization block 400, such as the plurality of node cost blocks 410 and plurality of minimum cost blocks 415, may be arranged in a trellis configuration. In at least one embodiment, this may allow for coefficients to be optimized using one or more dynamic programming methods. In general, each coefficient may be received at the optimization block in coding order. Multiple candidates of quantized coefficients may be generated, as described further below, along with an associated distortion cost calculation. The candidates may be provided to node cost calculation blocks (there may be one such block per possible coding state). The node cost calculation blocks may calculate a cost of each candidate given the node state, add the cost to the current node cost, its current context, and a next state for the candidate. Minimum costs may then be determined for each destination state, and that minimum cost provided back to the node cost unit. After the last coefficient has been received, the nodes may be evaluated to determine which has the lowest cost, and the context, cost, rate distortion, and list of quantized coefficients of the lowest cost node may be provided as an output of the optimization block.

For example, the candidate generation block 405 may be configured to receive sequential coefficients from the index 306 of FIG. 3, lambda or inverse lambda, and $Q_p$, a standard quantization parameter that may be provided from the mode decision block, e.g. the mode decision block of FIG. 2. The candidate generation block may provide a plurality of candidates ($u_0, u_1, u_2 \ldots$) for each coefficient in the coefficient vector, as will be described further below. Any number of candidates may generally be provided, for example three candidates may be provided in the example of FIG. 4, however other numbers of candidates may be used. The candidate generation block 405 may further provide a distortion cost (e.g. $D_0, D_1, D_2 \ldots$) for each candidate. Each node cost block 410 may be coupled to the candidate generation block 405 and correspond to a unique node state. For example, as illustrated in FIG. 4, the plurality of node cost blocks 415 may comprise eight node cost blocks 415 corresponding to the node states 0-7, respectively, which may be CABAC node states. The node state may, for instance, be defined by a NodeID control signal received by the node cost blocks 410. Each node cost block 410 may be configured to receive all the candidates and associated distortion costs from the candidate generation block 415. In the example of FIG. 4, each of the node cost blocks 401 may receive the candidates $u_0$, $u_1$, and $u_2$ in parallel along with their distortion costs $D_0$, $D_1$, and $D_2$. Accordingly, the connection between the candidate generation block 405 and the node cost blocks 410 may be as wide as the number of candidates, e.g. three wires wide, and provide capacity for a sufficient number of bits. The node cost blocks 410 may also receive the current context (Ctx) and a nodeID signal specifying the state. Each node cost block 410 may then provide an arc for each candidate. Each arc, may include a context, a cost, a distortion cost, a rate cost, a state, and a path including coefficients contributing to the arc. Accordingly, each arc may include 5 wires of information, and the connection between the node cost blocks 410 and the minimum cost blocks 415 may be 15 wires wide to provide sufficient space for all three arcs. Any number, however, may be used in other examples.

The minimum cost blocks 415, which may correspond in number to the node cost blocks 410 and may also correspond to unique node states, may each be configured to receive a plurality of arcs and determine which arc has a lowest cost. The particular node cost blocks 410 coupled to the minimum cost blocks 415 may be determined by allowable state transitions of the encoding method. Each of the minimum cost blocks 415 may further be configured to provide the lowest cost arc that was input to the minimum cost block 415 to a node cost block 410 having a same node state. Each node cost block 415 may be configured to update the received arc by adding respective costs of the arc to costs of new candidates as well as append each candidate to a path of the arc. The final minimum cost block 420 may be configured to receive the lowest cost arcs for each node state and identify an arc having the overall lowest cost, and may further be configured to provide the corresponding context, cost, rate cost, distortion cost, and path of the arc from the optimization block 400. The context may, for example, be provided to a context register, such as the context register 330 of FIG. 3 to be used in a next block optimization.

In an example operation of the optimization block 400, a first coefficient of a coefficient vector may be received at the candidate generation block 405, and the candidate generation block 405 may generate a plurality of candidates corresponding to the coefficient. In at least one embodiment, the candidates may be based, at least in part, on a quantization parameter Qp and/or inverse lambda, as will be described further below. The quantization parameter may be provided by a mode decision block, such as the mode decision block 230 of FIG. 2, and further may be indicative of a resolution factor for quantization. In addition to generating the plurality of candidates, the candidate generation block 405 may further generate a plurality of distortion costs corresponding to the plurality of candidates respectively. The candidate generation block 405 may be configured to generate three candidates and/or distortion costs for each coefficient, but embodiments of the invention should not be limited to a particular number, as other implementations may be used without departing from the scope and spirit of the invention.

Each candidate and distortion cost, in addition to an initial context and a respective node state, may be provided from the candidate generation block 405 to each of a plurality of node cost blocks 410. An arc for each candidate may be generated by each of the plurality of node cost blocks 410 based on the node state of each node cost block 410, the initial context, and the distortion cost of each candidate.

Each arc may be provided to one or more of a plurality of minimum cost blocks 415 based on the node state of each node cost block 410 and each minimum cost block 415. That is, as will be explained in more detail below, to reduce the number of potential paths, the node cost blocks 410 may provide arcs to particular minimum cost blocks 415 based on a state transition scheme, such as one or more state transition schemes according to the H.264 coding standard. Once each minimum cost block 415 has received its respective arc(s) from one or more of the node cost blocks 410, each minimum cost block 415 may determine which received arc has the lowest cost.

Each minimum cost block 415 may provide its lowest cost arc to the node cost block 410 having the same node state. New candidates and distortion costs corresponding to the next coefficient may also be received by the node cost blocks 410. Based, at least in part, on the received arcs, new candidates, and distortion costs, updated arcs may be provided to respective minimum cost blocks 415. The updated arcs may include a cost for the current candidate added to a previous fed-back cost, a next state for the candidate, and the candidate coefficient appended to a list of coefficients from the fed-back arc. Again, each minimum cost block 415 may determine which arc has the lowest cost and provide the lowest cost arc to the node cost block 410 having the same node state. This process may be repeated iteratively until candidates for all coefficients have been considered. The final minimum cost arcs for each node cost block 410 may be provided to the final minimum cost block 420, which may determine which arc has the lowest cost. The final list of appended coefficients in the selected lowest cost arc may be output (e.g. u[n] in FIG. 4), along with the cost, distortion cost, and rate cost specified by the selected lowest cost arc, and the context. The context may be stored in a register, e.g. the register 330 of FIG. 3, which may be used in subsequent block optimizations as input (e.g. ctx) to the optimization block 400.

Figure 5:
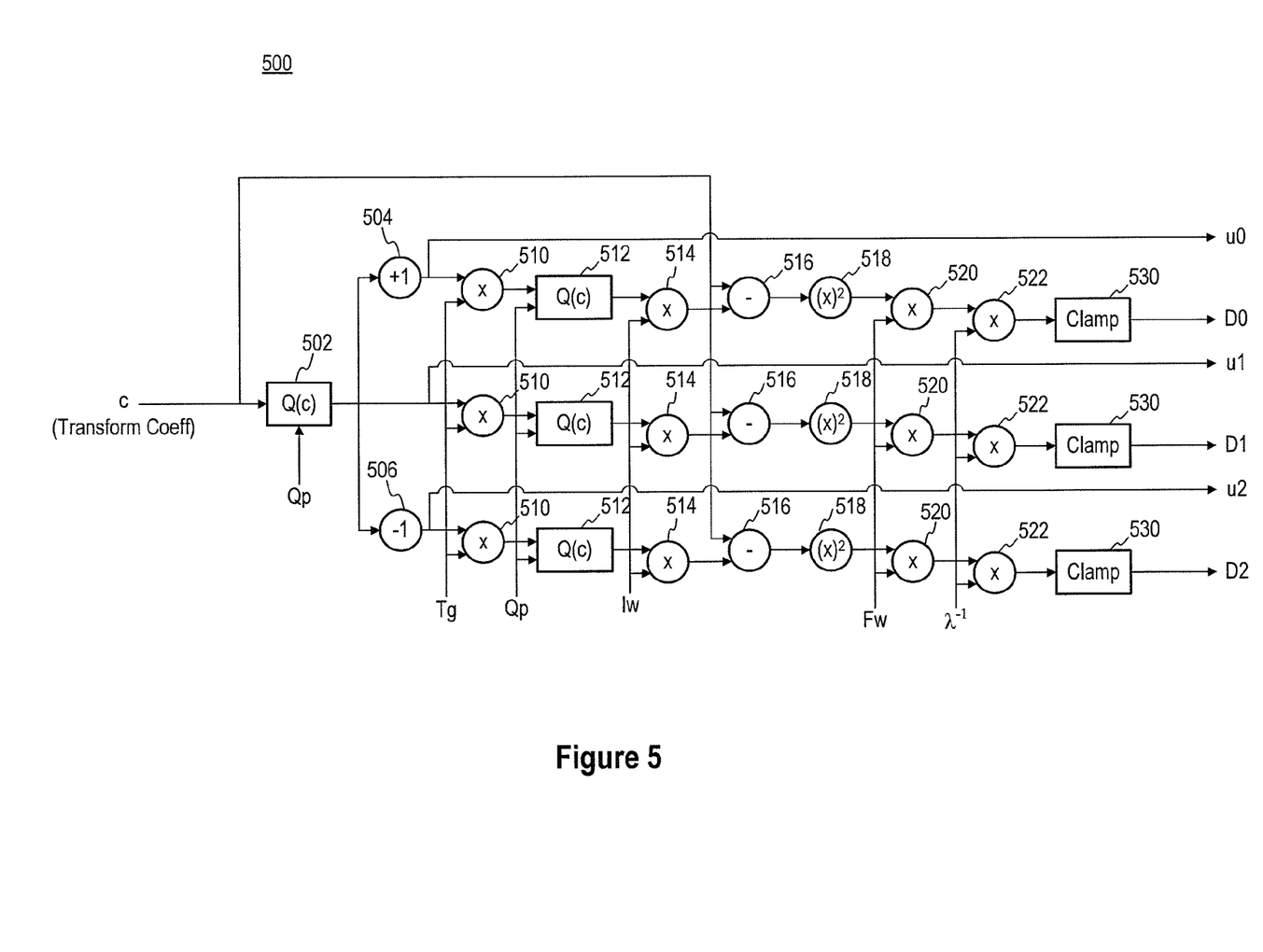
FIG. 5 is a schematic block diagram of a candidate generation block that may be used in the optimization circuit of FIG. 4 according to an embodiment of the invention.

FIG. 5 illustrates a schematic block diagram of a candidate generation block 500 according to an embodiment of the invention. The candidate generation block 500 may be used to implement the candidate generation block 405 of FIG. 4. As described, the candidate generation block 405 may receive coefficients of a coefficient vector and generate a plurality of candidates and distortion costs for each coefficient. Generally, the candidate generation block 500 may function to perform a forward quantization (e.g. HDQ) on an unquantized transform coefficient, based on the quantization parameter. Multiple additional candidates are generated, multiplied by a transform gain, and inverse quantization employed to provide a scaled coefficient. The scaled coefficient may be further scaled by an inverse weight factor to allow for scaling that would occur as part of the inverse transform in a decoder. The scaled and weighted coefficient may be subtracted from the original and the difference squared. The squared difference may then be scaled by a forward weight to account for imperfect integer transform used in H.264 encoding, then multiplied by inverse lambda and clamped to a particular bit width to yield the candidate.

In an example operation of the candidate generation block 500, each coefficient of a coefficient vector may be sequentially provided to the candidate generation block 500, and in particular, to the forward quantization block 502. As known, the forward quantization block 502 may quantize each coefficient based, at least in part, on the quantization parameter Qp, to generate a quantized coefficient in accordance with one or more quantization methods, e.g. HDQ. A plurality of candidates may be generated based, at least in part, on the quantized coefficient and provided from the candidate generation block 500, for instance, to a plurality of node cost blocks as described above. In one embodiment, the plurality of candidates may include the quantized coefficient as well as the quantized coefficient having increased and decreased quantization levels, respectively. The increased and decreased quantization level candidates may be provided by the candidate generation blocks 504, and 506, respectively.

A distortion cost for each candidate may also be generated by the candidate generation block 500. In one embodiment, for example, a multiplier 510 and an inverse quantization block 512 may be used to multiply each of the candidates with a transform gain and inverse quantize each of the candidates, respectively. Each candidate may further be scaled with an inverse weight at respective inverse weight blocks 514 to produce reconstructed candidates, which may subsequently be subtracted (e.g. using block 516) from the coefficient to generate a residual error between the coefficient and reconstructed candidate. Each error may be squared (e.g. using block 518), forward weighted (e.g. using block 520), and multiplied by inverse lambda (e.g. using block 522) to produce respective distortion costs for each candidate. The bit width for each distortion cost may be truncated by a clamp 530. Generally any number of bits may be set by the clamp, e.g. 25 bits in one example. In this manner, three multiplications with inverse lambda may be used to generate three coefficients. Inverse lambda may, in some examples, vary by coefficient, and utilizing candidate generation as described and shown with reference to FIG. 5 using inverse lambda may allow for per-coefficient lambda variation. Without the use of inverse lambda, lambda itself is typically applied after a rate is calculated, which may require a greater number of multiplications and may not permit per-coefficient lambda variation.

Figure 6:
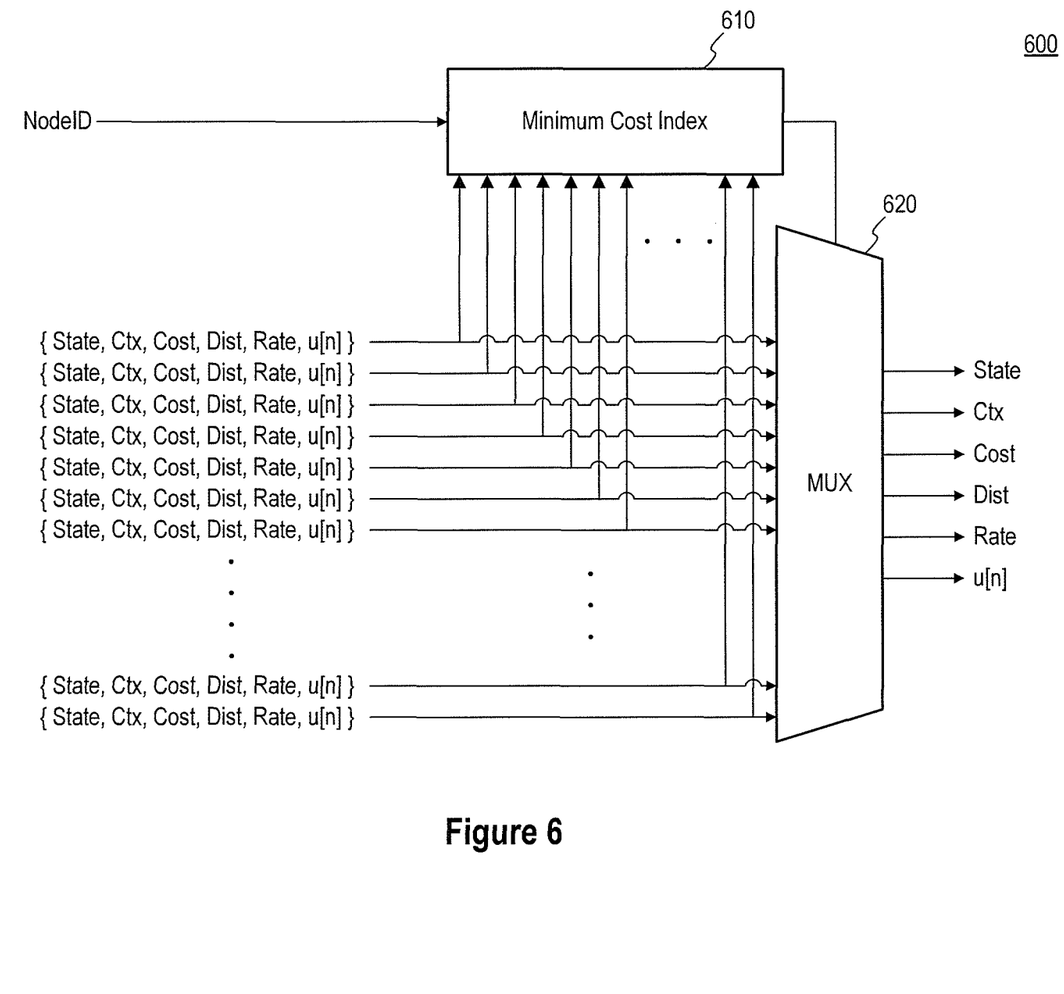
FIG. 6 is a schematic diagram of a minimum cost block that may be used in the optimization circuit of FIG. 4 according to an embodiment of the invention.

FIG. 6 is a schematic diagram of a minimum cost block 600 according to an embodiment of the invention. The minimum cost block 600 may be used to implement the minimum cost block 415 of FIG. 4. The minimum cost block 600 may include a minimum cost index 610 and a multiplexer 620. The minimum cost block 600 may be configured to receive a control signal NodeID, that in at least one embodiment, may assign a node state to the minimum cost block 600. Both the minimum cost index 610 and the multiplexer 620 may be configured to receive one or more arcs, for instance, from one or more node cost blocks, such as the node cost blocks 410 of FIG. 4. The minimum cost index 610 may determine which of the received arcs have states corresponding to the node state of the minimum cost block 600, and of those arcs, which has the lowest cost. The minimum cost index 610 may further be configured to cause the multiplexer 620 to selectively output the arc having the lowest cost responsive, at least in part, to determining which arc has the lowest cost. In this manner, only candidates transitioning into a desired state need be evaluated.

Figure 7:
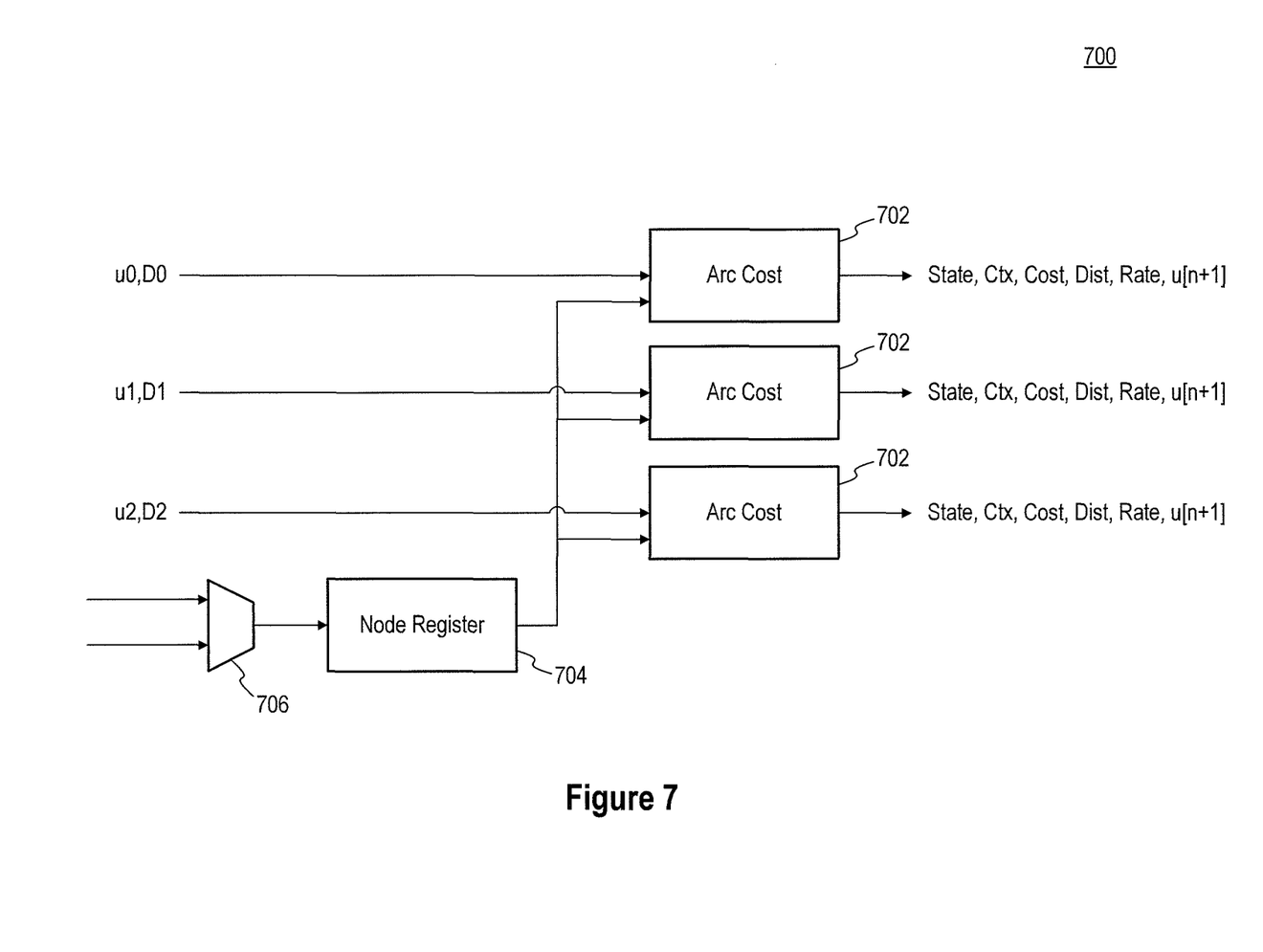
FIG. 7 is a schematic diagram of a node cost block that may be used in the optimization block of FIG. 4 according to an embodiment of the invention.

FIG. 7 is a schematic diagram of a node cost block 700 according to an embodiment of the invention. The node cost block 700 may be used to implement the node cost block 410 of FIG. 4. The node cost block 700 may include a plurality of arc cost blocks 702 (e.g. registers), a node register 704, and a multiplexer 706. The multiplexer 706 may receive an initial context and an arc, and may provide the initial context or arc to the node register 704. The node register 704 may receive and store the context or arc provided by the multiplexer 706.

The plurality of arc cost blocks 702 may correspond in number to the number of candidates generated for each coefficient, for instance, by a candidate generation block, and accordingly, each of the plurality arc cost blocks 702 may receive a candidate and distortion cost. Each arc cost block 702 may receive the initial context or arc from the node register 704 and may provide an updated arc for each respective candidate.

As an example, during an initialization, an initial context may be provided to the multiplexer 706, which may in turn selectively provide the initial context to the register 704. Candidates and distortion costs for a first coefficient may be generated, for example, by a candidate generation block 405 of FIG. 4, and provided to the node cost block 700. Respective candidates and distortion costs as well as the initial context in the register 704 may be provided to each of the plurality of arc cost blocks 702. Based on the candidates, distortion costs, and the initial context, each arc cost block 702 may provide an arc.

As described above with respect to FIG. 4, minimum cost blocks may provide lowest cost arcs to node cost blocks responsive, at least in part, to identifying the lowest cost arc, and responsively, node cost blocks may provide updated arcs. However, for candidates based on the first coefficient, respective node cost blocks may not have yet received an arc. Accordingly, for candidates corresponding to the first coefficient, a node cost block may provide an arc based, at least in part, on the initial context as well as initial values (e.g., zero) for other parameters of an arc (e.g., cost, rate cost, distortion cost, path, and/or state). In one embodiment, initial values for these parameters may be provided with the initial context, for example, from the node register 704.

Once arcs have been generated for the first candidates, each of the arcs may be provided to one or more minimum cost blocks 415, and an arc having the lowest cost for each node state may be provided to the node cost block having the same node state, as described. Thus, in at least one embodiment, an arc determined to have the lowest cost for a particular node state may be provided to a node cost block 700, and in particular to the multiplexer 706. The multiplexer 706 may selectively provide the arc to the register 704, which may in turn provide the arc to the arc cost blocks 702. The arc cost blocks 702 may receive new respective candidates and distortion costs for a subsequent coefficient, and again provide updated arcs. The arc cost blocks 702 may receive lowest cost arcs, new candidates and distortion costs, and responsively provide updated arcs until candidates for all coefficients of a coefficient vector have been considered.

Figure 8:
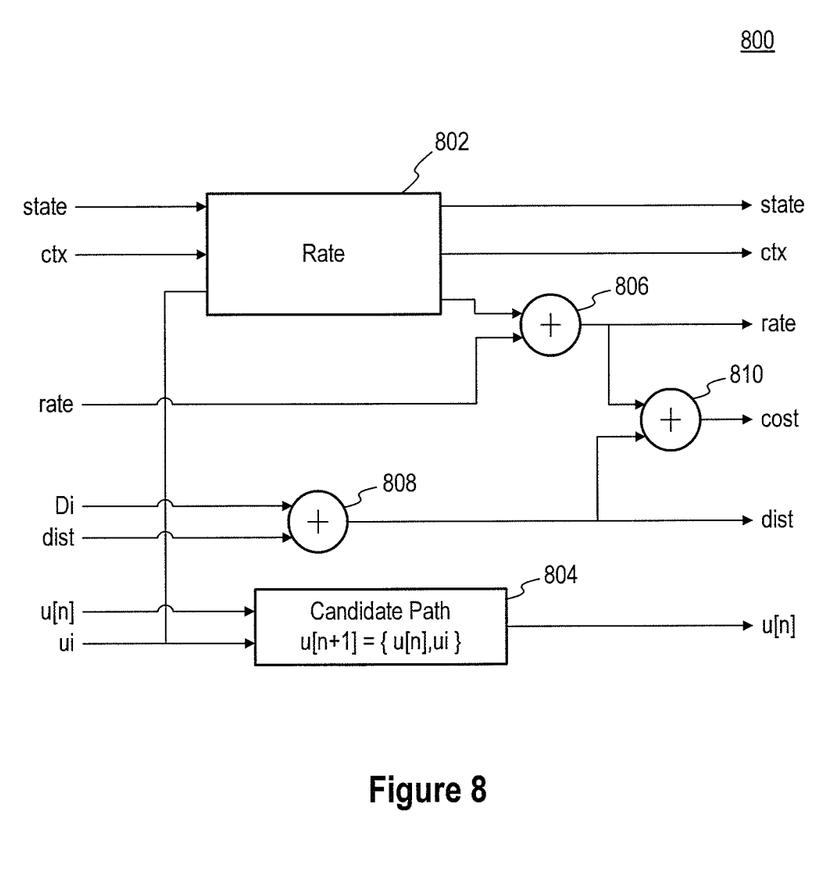
FIG. 8 is a schematic diagram of an arc cost block that may be used in the node cost block of FIG. 7 according to an embodiment of the invention.

FIG. 8 is a schematic diagram of an arc cost circuit 800 according to an embodiment of the invention. The arc cost block 800 may be used to implement the arc cost block 702 of FIG. 7. The arc cost block 800 may include a rate block 802, adders 806, 808, 810, and a candidate path block 804, and may be configured to provide an updated arc responsive, at least in part, to receipt of a candidate. The arc cost block 800 may, for example, combine various costs (e.g., distortion costs, rate costs, and/or rate-distortion costs) of an arc and the candidate respectively, and further may provide a new state, context, and path for the updated arc.

As an example operation of the arc cost block 800, a candidate, and a state and context of an arc may be provided to the rate block 802. The state may be based, for instance, on a state transition scheme in accordance with the H.264 coding standard, and the rate block 802 may determine a next state based on the state and/or the candidate. The rate block 802 may further determine a rate cost of the candidate and/or context for a new arc. In one embodiment, for example, the rate block 802 may determine the rate cost of the candidate and/or context using estimation tables for one or more coding standards, such as the H.264 coding standard.

The rate cost of the candidate may be combined with the rate cost of the arc by the adder 806. Moreover, the distortion cost may be combined with the distortion cost included in the arc by the adder 808. An adder 810 may combine the combined distortion cost and the combined rate cost to generate a cost for the updated arc. Finally, the candidate path block 804 may receive the path of the arc and the candidate, and append the current candidate to the path. This may, for example, maintain a complete list of the candidates used in a path, and should a particular arc have the overall lowest cost, the candidates included in the path may be provided as optimized quantized coefficients as described above.

Figure 9:
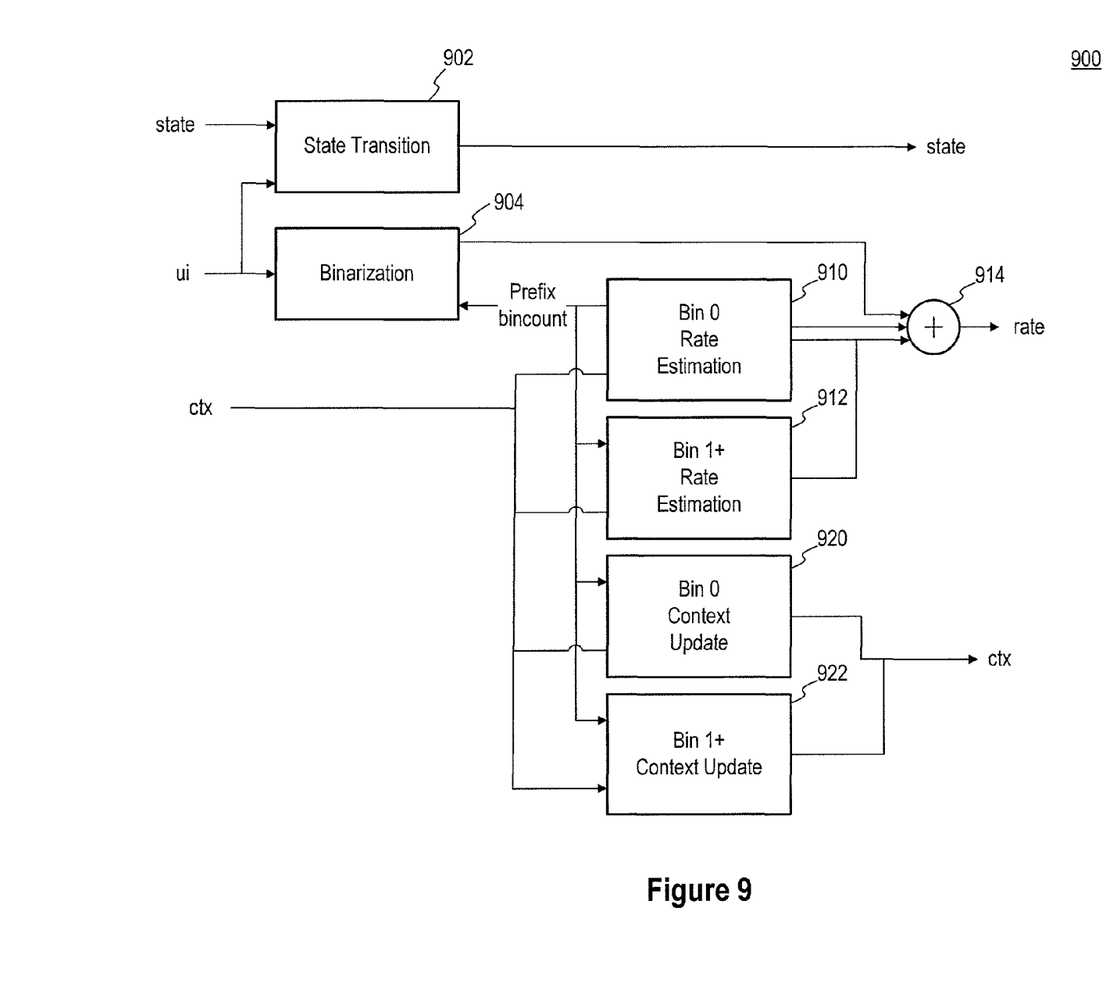
FIG. 9 is a schematic diagram of a rate block that may be used in the arc cost block of FIG. 8 according to an embodiment of the invention.

FIG. 9 is a schematic diagram of a rate block 900 according to an embodiment of the invention. The rate block 900 may be used to implement the rate block 802 of FIG. 8. The rate block 900 may include a state transition block 902, a binarization block 904, an adder 914, estimation tables 910, 912 (e.g. look-up tables), and update tables 920, 922 (e.g. look-up tables).

The state transition block 902 may generate a new state responsive to receipt of a state and a candidate. The new state may be generated in accordance with a state transition scheme, and/or the candidate value. The binarization block 904 may receive the candidate and perform a binarization on the candidate in accordance with binarization of the H.264 coding standard. As known, this binarization process may generate a bypass bitcount and a prefix bincount. The bypass bitcount is a number bypass bits represented by the coefficient, while the prefix bincount provides a number of prefix bins represented by the coefficient. The bins may each have a particular number of bits. The prefix bincount and a context for an arc may be provided to both the estimation tables 910, 912 and the update tables 920, 922. The estimation tables 910, 912 and update tables 920, 922 may be implemented using look-up tables. The look-up tables may allow for rates to be estimated fractionally. The estimation tables 910, 912 provide the estimated CABAC rate for bin0 and the remaining bins, respectively. Accordingly, the number of bypass bits may be known (e.g. bypass bitcount), and a rate for bin0 may be provided by table 910, and a rate for subsequent bins provided by table 910. The rates provided by the tables 910 and 912 may be added to the bypass bitcount to obtain the rate. Similarly, the next CABAC context given a current context and the prefix bincount may be provided by the tables 920 and 922. Each portion of the context may be updated by the bins, and according the tables 920 and 922, accordingly the output of the tables 920 and 922 may be combined to yield a next context (e.g. ctx).

As a result, new contexts, such as CABAC contexts, may be provided from the update tables 920, 922 in accordance with the prefix bincount and the arc context. Moreover, using the prefix bincount and the context, estimated encoding rate costs, such as estimated CABAC encoding rate costs, may be provided for each bin. That is, rate cost estimations (e.g., fractional bit rate cost estimations) in the estimation tables 910, 912 may be combined with the bypass bitcount at the adder 914 to provide a rate cost for a candidate. In at least one embodiment, estimating the rate costs for CABAC encoding may mitigate and/or eliminate the need for arithmetic encoding to determine the rate cost for each candidate. This may decrease the time required to determine a rate cost for a candidate, for instance, within a predetermined tolerance. Utilization of the look-up tables described may facilitate real-time operation of the systems and methods described herein. Techniques utilizing arithmetic encoding may not be able to implement real-time operation.

Figure 10:
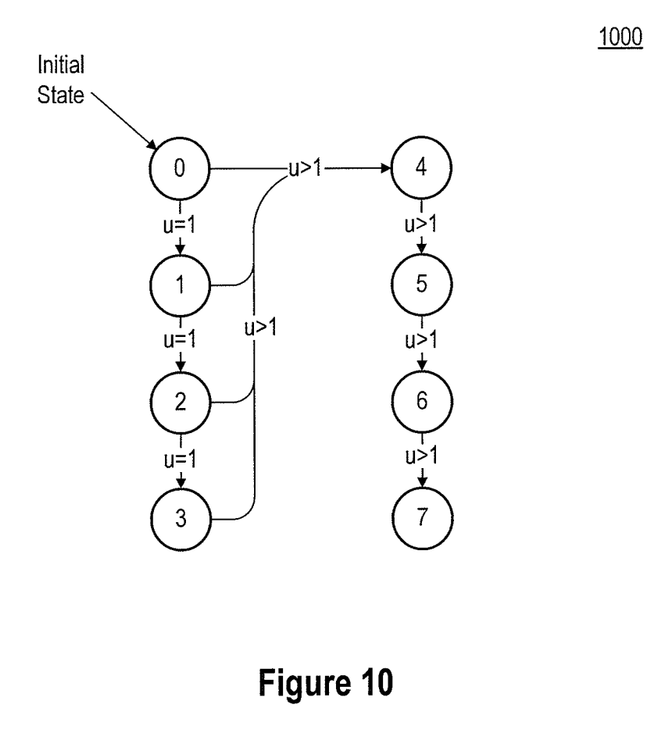
FIG. 10 is a state diagram according to an embodiment of the invention.

FIG. 10 is a state diagram 1000 for node states according to an embodiment of the invention. The state transition scheme of the state diagram 1000 may govern permitted state transitions of states received by the rate block 902 of FIG. 9 and further may be arranged in accordance with the H.264 coding standard. Generally, a state may change based on the value of a candidate and in some examples, on the absolute value of the candidate. In one embodiment, for example, a state transitions may be governed by the following:

NEXT(s,u)=(u==0) ? s:
   (u==1) ? ((s<4) ? min(3,s+1):):
     min(7,max(4,s+1)), where 'u' may be an absolute value of a candidate value and 's' may a state. It will be appreciated, however, that other state transitions may be specified and used to govern state transitions of states without departing from the scope and spirit of the invention.

Moreover, as explained above with respect to FIGS. 4 and 6, respectively, in at least one embodiment, node cost blocks 410 may provide arcs only to particular minimum cost blocks 415, and only arcs received by a minimum cost block 600 having a state corresponding to the node state of the minimum cost block 600 may be considered in determining which, of any received arcs has the lowest cost. This follows from the fact that states may transition according to the state diagram 1000 illustrated in FIG. 10. For example, a state of 2 may remain at a state of 2 if a candidate has a value of 0, or transition to a state of 3 or 4 if a candidate has an absolute value of 1 or greater than 1, respectively. Accordingly, the node cost block 410 (FIG. 4) having a node state of 2 may provide arcs to minimum cost blocks 415 having node states of 2, 3, and 4. Each of those minimum cost blocks 415 receiving the arcs may then determine whether any of the states of the arcs match their respective node state.

Accordingly, embodiments of the present invention include systems and methods that may optimize coefficients in a macroblock using a lambda-weighted rate-distortion cost equation. Embodiments may be used for real-time encoders, such as real-time CAVLC and/or CABAC encoders, and may employ fractional bit estimations and inverse lambda.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An encoder configured to receive a video signal, the encoder comprising:
   a prediction block configured provide a predictor in accordance with an encoding standard;
   a subtractor configured to subtract the predictor from the video signal to provide a residual;
   a transform configured to receive the residual and provide the residual in the frequency domain including a plurality of coefficients;
   a quantization block configured to serially receive the plurality of coefficients, optimize rate-distortion associated with the plurality of coefficients to generate a plurality of modified coefficients, wherein the quantization block includes:
      an optimization block configured to:
         generate a plurality of candidates for each of the plurality of coefficients,
         calculate a bit rate associated with each of the candidates using look-up tables that are configured to provide a fractional bit rate estimation,
         calculate, for each of the plurality of candidates, an arc that includes the candidate's respective calculated bit rate,
         identify a minimum cost arc, and
         output the plurality of modified coefficients having the minimum cost arc; and
   a coding block configured to encode the plurality of modified coefficients into a coded bitstream in accordance with the encoding standard.

2. The encoder according to claim 1 wherein the optimization block is further configured to calculate a distortion cost associated with each candidate, wherein the distortion cost is calculated using inverse lambda.

3. The encoder according to claim 1 wherein the encoding standard is the H.264 coding standard.

4. The encoder according to claim 1, further comprising a mode decision block configured to receive the video signal and provide lambda to the quantization block.

5. The encoder according to claim 1, wherein the bit rate associated with each of the candidates is clamped to a predetermined number of bits.

6. The encoder according to claim 1, wherein the optimization block includes:
   a node cost block for each state of an encoding standard, wherein the node cost blocks are each configured to generate an arc associated with each candidate, wherein the arcs each include a bit rate cost and a distortion cost; and
   minimum cost blocks associated with the node cost blocks, wherein each of the minimum cost blocks is configured to receive arcs from the node cost blocks corresponding to a state of the minimum cost blocks, wherein the minimum cost blocks are configured to identify a lowest cost arc from the received arcs, generate an updated arc, and provide the updated arc to the node cost block associated with the respective state.

7. An optimization block for generating modified coefficients for use in encoding video, the optimization block comprising:
   a candidate generation block configured to generate a plurality of candidate coefficients based, at least in part, on a received coefficient,
   a plurality of node cost blocks coupled to the candidate generation block, each of the plurality of node cost blocks configured to provide a plurality of arcs based, at least in part, on the plurality of candidates, each of the plurality of arcs including a bit rate cost and a distortion cost, wherein the bit rate cost is calculated using fractional bit rate estimation, and the distortion cost is calculated using inverse lambda; and
   a plurality of minimum cost blocks coupled to at least one of the plurality of node cost blocks and configured to receive at least one of the respective plurality of arcs and determine which arc of the at least one respective plurality of arcs has a lowest cost.

8. The optimization block of claim 7, wherein the apparatus is included in an encoder.

9. The apparatus of claim 7, wherein the plurality of node cost blocks and the plurality of minimum cost blocks are configured in a trellis arrangement.

10. The apparatus of claim 7, wherein the optimization block further includes a rate block configured to calculate the bit rate cost, wherein the rate block is configured to perform a binarization process to provide a prefix bincount and a bypass bitcount, wherein the rate block includes:
   a first bit rate estimation table configured to output a first bit rate cost for one of the bins of the prefix bincount, and
   a second bit rate estimation table configured to output a second bit rate cost for another of the bins of the prefix bincount; and
   an adder configured to add the first bit rate cost, the second bit rate cost, and the bypass bitcount to provide the bit rate cost.

11. The apparatus of claim 10, wherein the first and second bit rate estimation tables are look-up tables.

12. The apparatus of claim 10, wherein the optimization block further includes a first state update table configured to provide a first context update based on one of the bins of the prefix bincount and a second update table configured to provide a second context update based on another of the bins of the prefix bincount, and wherein the optimization block is configured to combine the first context update and the second context update to generate a next context.

13. The apparatus of claim 12, wherein the first, second, and next contexts are CABAC contexts.

14. A method, comprising:
 generating a residual based on a difference between a predicted video signal and an actual video signal;
 transforming the residual to a frequency domain including a plurality of coefficients;
 optimizing rate-distortion associated with the plurality of coefficients to generate a modified set of coefficients, wherein said optimizing rate-distortion comprises generating candidate coefficients using inverse lambda and estimating bit rates associated with the plurality of coefficients using look-up tables that are configured to provide a fractional bit rate estimation; and
 encoding the modified set of coefficients for use in video transmission.

15. The method of claim 14, wherein said optimizing comprises:
 performing an inverse zigzag operation on the plurality of coefficients to generate a coefficient vector; and
 serially processing the coefficients of the coefficient vector.

16. The method of claim 14, wherein said optimizing comprises utilizing a trellis optimization technique to find a minimum cost arc associated with the candidate coefficients using CABAC states.

17. The method of claim 14, wherein the encoding comprises encoding at a fixed bit rate configured to generate a CAVLC bitstream.

18. The method of claim 14, further comprising transcoding the CAVLC bitstream to generate a CABAC coded bitstream.

19. The method of claim 18, wherein the transcoding comprises real-time conversion.

20. The method of claim 14, wherein the predicted video signal is generated in accordance with an H.264 standard.

21. The encoder of claim 1, wherein the optimization block is configured to identify the minimum cost set of coefficients using a trellis optimization technique.

* * * * *